Patented May 26, 1936

2,042,436

UNITED STATES PATENT OFFICE 2,042,436

PURIFICATION OF TITANIUM COMPOUNDS

Svend S. Svendsen, Madison, Wis., assignor to Burgess Titanium Company, Madison, Wis., a corporation of Delaware No Drawing. Application June 4, 1935, Serial No. 24,820

7 Claims. (Cl. 23—88)

This invention relates to the purification of titanium compounds, especially the removal of heavy metals, and in particular iron, therefrom. This application is a continuation in part of my copending application Serial No. 745,753 filed September 27, 1934.

It is an object of this invention to provide a method for purifying titanium compounds and especially a method whereby the iron content thereof may be decreased to a negligible amount.

I have found that when titanium-bearing ores, especially the oxide ores such as ilmenite and rutile, are treated, as described in the above application, with reactive fluorides, such as ammonium fluoride or ammonium bifluoride, whereby a water soluble titanium fluoride or fluoride compound is formed, the small amounts of heavy metals, particularly iron, remaining soluble in water solution thereof may be separated from the titanium if such solution is treated as described herein. These metals, and especially iron, must be removed from the titanium salts if a high grade of white titanium oxide pigment is to be made therefrom. The iron is present in such solutions as iron fluoride. If ammonium fluoride is also present a double fluoride of iron and ammonia may be formed. Specifically, I have found that iron may be substantially quantitatively separated from titanium-bearing materials by forming fluoride solutions of such materials and treating such solutions under the conditions hereinafter described with soluble sulfides. Under these conditions a titanium compound does not precipitate simultaneously in appreciable amount with the iron sulfide. I have found further that this effect of the fluoride salts in effecting a separation of the iron from the titanium is heightened by the presence of an additional soluble fluoride salt such as ammonium fluoride.

In order to remove iron as an insoluble sulfide from solutions containing its salts, such solutions must not be acidic. Solutions of the ordinary titanium salts, such as the sulfate, which is used extensively in the production of titanium oxide pigment, hydrolyze when neutral and especially if a soluble sulfide is added to the solution. It therefore is impossible or impracticable to remove iron by precipitating it as the sulfide from such solutions. I have discovered, however, that it is possible to regulate solutions of titanium fluoride salts within narrow limits of hydrogen ion concentration, whereby when a soluble sulfide is added, the iron is precipitated substantially quantitatively therefrom without simultaneously precipitating appreciable amounts of titanium. I have further found that the tendency of the soluble sulfide to form titanium hydrate or other insoluble titanium compound in such titanium fluoride solutions seems to be depressed further by the presence of an additional soluble fluoride salt, such as ammonium fluoride. It is desirable therefore to have such a salt present in a solution which is to be treated with a soluble sulfide.

Titanium fluoride compound solutions may be made conveniently as described in the above referred to application by digesting finely ground ilmenite with a concentrated solution of ammonium fluoride or bifluoride in large excess, the digestion continuing until the temperature reaches a temperature of 150°–180° C. or until most of the water is driven from the reaction mass. The large excess (usually 50% or more than the stoichiometric amount) of the ammonium fluoride which is used to secure complete conversion of the ilmenite into fluorides, also has the advantage of adding the desired excess of ammonium fluoride to the resulting titanium fluorides. The titanium fluorides so produced apparently are tetrafluorides and this invention is directed particularly to the use of such tetrafluorides. The residue, a grayish paste or powder, is lixiviated with water and filtered, the iron and ammonium double fluoride being practically insoluble. The filtrate is a solution of ammonium fluoride and titanium fluoride compound containing small amounts of dissolved iron fluoride as an impurity.

The solution so formed is acidic and must be neutralized, preferably with ammonia, to the point at which the addition of more ammonia precipitates out permanently titanium hydrate or a crystalline titanium compound. This point is designated as "substantially neutral" for convenience hereinafter, usually at a pH of about 6.8, and must be closely maintained until the insoluble sulfides are removed from this solution.

After this condition is attained, a convenient soluble sulfide is added to the solution to precipitate iron and other heavy metals. Ammonium sulfide may be used. Sodium or potassium sulfides or hydrogen sulfide are other soluble sulfides that may be used. If hydrogen sulfide is used, additional alkali is required to maintain the necessary neutrality or the iron sulfide will be dissolved. The iron and other heavy metals dissolved in the titanium fluoride solution are precipitated as sulfides either in a hot or cold solution, a hot solution (about 50°–60° C.) being preferred. The precipitate may be filtered readily from the solution together with any other insolubles that may be present. The iron sulfide is precipitated as the ferrous salt, the ammonium sulfide reducing any ferric salts to the ferrous condition. Precautions must be taken to prevent the ferrous sulfide from being again oxidized to the ferric condition whereby it will again dissolve in the fluoride solution before it is separated from the solution.

In general the ratio of $NH_4F$ to $TiF_4$ in solution should be greater than 1 to 1 by weight and less than 5 to 1 by weight, though the invention is not limited to proportions within these limits. A convenient concentration is one in which the specific gravity is about 1.110 to 1.125 (at 60° C.).

When a titanium tetrafluoride is referred to in the claims, this covers titanium tetrafluoride as such and also associated or combined with other salts as double salts or compounds, ammonium fluotitanate being an example of such a compound.

Although in the above disclosure the titanium fluoride solution is neutralized before adding the soluble sulfide, it will be obvious to those skilled in the art that the soluble sulfide, especially hydrogen sulfide, may be added to the solution before neutralizing. Upon neutralizing the thus sulfide-containing solution the iron sulfide is precipitated. This variation is within the scope of the appended claims.

I claim:

1. In the treatment and purification of titanium compounds, adding a soluble sulfide to a substantially neutral solution of a titanium tetrafluoride, and maintaining the neutrality of said solution to precipitate dissolved heavy metals therefrom.

2. In the treatment and purification of titanium compounds, adding ammonium sulfide to a substantially neutral solution of a titanium tetrafluoride, and maintaining the neutrality of said solution to precipitate heavy metals therefrom.

3. In the treatment and purification of titanium compounds, adding a soluble sulfide to a substantially neutral solution of a titanium tetrafluoride containing ammonium fluoride, and maintaining the neutrality of said solution to precipitate dissolved heavy metals therefrom.

4. In the treatment and purification of titanium compounds, adding ammonium sulfide to a substantially neutral solution of a titanium tetrafluoride containing ammonium fluoride, and maintaining the neutrality of said solution to precipitate dissolved iron therefrom.

5. In the treatment and purification of titanium compounds, adding a soluble sulfide to a substantially neutral solution of a titanium tetrafluoride containing ammonium fluoride wherein the ratio of $NH_4F$ to $TiF_4$ is from 1:1 to 5:1, and maintaining the neutrality of said solution to precipitate dissolved heavy metals therefrom.

6. In the treatment and purification of titanium compounds, adding ammonium sulfide to a substantially neutral solution of a titanium tetrafluoride containing ammonium fluoride wherein the ratio of $NH_4F$ to $TiF_4$ is from 1:1 to 5:1, and maintaining the neutrality of said solution to precipitate dissolved iron therefrom.

7. In the treatment and purification of titanium compounds, adding ammonium sulfide to a substantially neutral solution of a titanium tetrafluoride containing ammonium fluoride, maintaining the neutrality of said solution and removing the insolubles therefrom while maintaining reducing conditions therein.

SVEND S. SVENDSEN.